Patented Feb. 21, 1939

2,148,316

UNITED STATES PATENT OFFICE 2,148,316

PROCESS FOR FINISHING CHINTZ

Arnold Leroy Lippert, Wilmington, Del., assignor to Joseph Bancroft & Sons Co., Wilmington, Del., a corporation of Delaware No Drawing. Application November 26, 1937, Serial No. 176,635

4 Claims. (Cl. 91—70)

This invention relates to chintz and it has for its primary object an improved process for finishing chintz, providing a surface which will retain its lustre even after repeated launderings, is spot proof, appreciably fire resistant, and has some degree of flexibility and foldability.

The present application is a continuation in part of my copending application, Serial No. 136,525, filed April 13, 1937, Patent 2,103,293.

In said prior application I disclosed use of the resin, urea formaldehyde, for the above purpose, preferably in the presence of a protein coagulatable by heat, such as albumin or wheat gluten, and less desirably, casein.

While use of the urea formaldehyde alone does not make possible tearing of the material quite as straight from selvedge to selvedge as when combining the formaldehyde with a coagulatable protein, still I have found that proper handling of the material when using urea formaldehyde alone affords a finish which is highly satisfactory for many purposes and from many standpoints, such as the retention of lustre even after repeated launderings, and spot and fire proof characteristics.

If setting of the urea formaldehyde is effected simultaneously with glazing, as by passing the cloth through a heated glazer, the finish is highly glossy, and if the cloth be passed through a calender using high pressure and heat, the finish is less glossy.

The urea formaldehyde is desirably employed in aqueous solution in a range from about 10% to about 30% by weight. Preferably, however, the urea formaldehyde is kept within from about 15% to about 20%. This is of importance, as are also the manipulative steps hereinafter described, in providing the best type of finish.

With reference to this matter I am aware that formaldehyde resins of various types have been used in the treatment of cloth for other purposes but in such cases the handling of the material or the concentration of urea formaldehyde, or both, have been such as to produce effects entirely different from the chintz finish of this invention.

I am further aware that other resins, such as natural water soluble resins and water soluble or emulsifiable synthetic resins (for example phenol resin and acrylic resin) have been used heretofore in the treatment of cloth for various purposes. These, however, cannot be effectively used for the purposes of this invention. Some of them are incapable of withstanding the heat and break down, and with others the finish is unsatisfactory because they are water soluble after polymerization, or for other reasons.

However, the particular resin, urea formaldehyde, when employed in the percentage range and in accordance with the method hereinafter set out, is effective to produce the desired finish. This particular resin is substantially colorless and while its components are water soluble, in the polymerized state it is insoluble in water and not even attacked in a boiling soap solution. This resin, furthermore, is thermo-plastic before heating.

In carrying out the invention the solution of urea formaldehyde is prepared in the cold. Preferably the urea formaldehyde is first dissolved in water, and two additional ingredients are added, first, a catalyst, such as an acid salt (for example, ammonium phosphate) and second, a softening agent, such as ethyl cellulose.

As an example of a solution which has given highly satisfactory results I call attention to the following: urea formaldehyde 12½ pounds, ammonium phosphate 1¼ pounds, ethyl cellulose 1½ pounds, and sufficient water to make one hundred (100) pounds.

The cloth is subjected to the solution for a period of time merely sufficient to thoroughly impregnate. Application of the solution or impregnation of the cloth may be accomplished in various ways such, for example, as by the use of padder rolls, the lower one of which dips into the solution.

Following the above, the cloth is dried, preferably at a temperature of from about 150° to about 200° F. and in any event below the temperature at which the urea formaldehyde would be appreciably polymerized. Desirably, the drying is carried out in a manner to retain about 10% moisture in the cloth.

After impregnation and drying of the cloth, the cloth is preferably subjected to either one of two treatments adapted simultaneously to glaze and apply heat. The glazing may be effected either by pressure or roll slippage or both and the temperature employed is preferably upwards of about 320° F.

For a highly glossy finish, the impregnated cloth, after drying on a frame, is run through a glazer of generally usual construction and in which the upper roll is preferably made of steel and is heated to a temperature of from about 320° F. to about 400° F., the middle roll being the usual husk roll and the bottom roll being made of metal. The middle and bottom rolls are not directly heated and only become warm to the extent that heat is absorbed from the top roll. In this glazer, the top roll operates at a peripheral speed higher than that of the husk roll.

If a less highly glossy finish is desired, the impregnated cloth, after drying on a frame, is run through a calender in which the rolls revolve at exactly the same speed. The cloth may here be given two nips, and may be run once or several times. Here the temperature should preferably be at least 400° F. and the pressure should preferably be at least five (5) tons per square inch, and desirably substantially above this figure.

In both cases the resin is set (polymerized) by the heat and in both cases glazing is accomplished simultaneously with setting.

In the case of treatment in the glazer oven treatment may follow to insure setting.

In describing the invention I have referred to chintz, but it is to be understood that the invention is applicable to other mechanically lustrous products.

The finish imparted in accordance with the invention is relatively permanent and the color and pattern, if any, remain substantially unaffected by the treatment.

I claim:

1. The process of imparting a permanent lustrous finish to chintz which comprises subjecting the fabric to an aqueous solution of urea formaldehyde having a concentration of substantially 15% to substantially 20% urea formaldehyde, drying the fabric to a moist condition at a temperature below that at which the urea formaldehyde would be polymerized, and glazing the fabric in the presence of sufficient heat to set the urea formaldehyde, whereby the imparting of the finish and the setting of the resin are accomplished simultaneously.

2. The process of imparting a permanent lustrous finish to chintz which comprises subjecting the fabric to an aqueous solution of urea formaldehyde having a concentration of substantially 15% to substantially 20% urea formaldehyde, drying the fabric to a moist condition at a temperature below that at which the urea formaldehyde would be polymerized, and subjecting the fabric to the action of a glazer heated to a temperature between substantially 320° F. and 400° F. whereby simultaneously to set the resin and glaze the fabric.

3. The process of imparting a permanent lustrous finish to chintz which comprises subjecting the fabric to an aqueous solution of urea formaldehyde having a concentration of substantially 15% to substantially 20% urea formaldehyde, drying the fabric to a moist condition at a temperature below that at which the urea formaldehyde would be polymerized, and subjecting the fabric to the action of a calender exerting a pressure upwards of substantially five (5) tons per square inch in the presence of heat sufficient to set the resin, whereby the finish and the setting of the resin are accomplished simultaneously.

4. The process of imparting a permanent lustrous finish to chintz which comprises subjecting the fabric to an aqueous solution of urea formaldehyde having a concentration of substantially 10% to substantially 30% urea formaldehyde, drying the fabric to a moist condition at a temperature below that at which the urea formaldehyde would be polymerized, and mechanically imparting the desired finish in the presence of heat sufficient to set the resin, whereby the imparting of the finish and the setting of the resin are accomplished simultaneously.

ARNOLD L. LIPPERT.